United States Patent
Kim et al.

(10) Patent No.: US 10,328,748 B1
(45) Date of Patent: Jun. 25, 2019

(54) OFFSET CASTERS, COMPUTING DEVICE SUPPORTS, SYSTEMS FOR SUPPORTING A COMPUTING DEVICE, AND METHODS OF USE

(71) Applicant: Microsoft Technology Licensing, LLC, Redmond, WA (US)

(72) Inventors: Young Soo Kim, Seattle, WA (US); Timothy Guyton Escolin, Seattle, WA (US); Ryan Eugene Whitaker, Seattle, WA (US); Kae-Ling Jacquline Gurr, Seattle, WA (US); Jonne Aapi Harju, Kirkland, WA (US); Mack Ho, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/869,814

(22) Filed: Jan. 12, 2018

Related U.S. Application Data (60) Provisional application No. 62/610,405, filed on Dec. 26, 2017.

(51) Int. Cl.
*B60B 33/00* (2006.01)
*G06F 1/16* (2006.01)
*F16M 11/42* (2006.01)
*B60B 33/02* (2006.01)

(52) U.S. Cl.
CPC .......... *B60B 33/0015* (2013.01); *B60B 33/02* (2013.01); *F16M 11/42* (2013.01); *G06F 1/16* (2013.01)

(58) Field of Classification Search
CPC . B60B 33/00; B60B 33/0047; B60B 33/0057; B60B 33/0076; B60B 33/0015; B16M 11/45
See application file for complete search history.

(56) References Cited

U.S. PATENT DOCUMENTS

| | | | | |
|---|---|---|---|---|
| 1,899,394 A | * | 2/1933 | Noelting | A47B 91/02 16/19 |
| 2010/0263164 A1 | * | 10/2010 | Lin | B60B 33/0042 16/47 |
| 2011/0203074 A1 | * | 8/2011 | Trivini | B60B 33/0028 16/45 |
| 2011/0232028 A1 | * | 9/2011 | Lee | B60B 33/0002 16/45 |
| 2012/0042472 A1 | * | 2/2012 | Aubin | B60B 33/0015 16/46 |
| 2013/0326844 A1 | * | 12/2013 | Stoehr | B60B 27/001 16/46 |
| 2016/0244080 A1 | * | 8/2016 | Barden | B62B 5/065 |

* cited by examiner

*Primary Examiner* — Brian L Swenson
(74) *Attorney, Agent, or Firm* — Ray Quinney & Nebeker P.C.; Paul N. Taylor (57) ABSTRACT

An offset caster is described. The offset caster includes a wheel, an axle connected to the wheel, and an offset base connected to the axle. The offset base is offset by a distance. The offset base includes a connection to a computing device support. Computing device supports that include at least one offset caster are described. Systems for moving a computing device that include a computing device and a computing device support with at least one offset caster are described.

20 Claims, 9 Drawing Sheets

OFFSET CASTERS, COMPUTING DEVICE SUPPORTS, SYSTEMS FOR SUPPORTING A COMPUTING DEVICE, AND METHODS OF USE

CROSS-REFERENCE TO RELATED APPLICATION

This application claims the benefit of U.S. Provisional Patent Application No. 62/610,405, filed on Dec. 26, 2017, which is hereby incorporated by reference in its entirety.

BACKGROUND

Background and Relevant Art

Use of computing devices is becoming more ubiquitous by the day. Computing devices range from standard desktop computers to wearable computing technology and beyond. One area of computing devices that has grown in recent years is interactive televisions. Interactive televisions are computing devices that may vary in size and can be quite large.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY

In one implementation, an offset caster is described. The offset caster includes a wheel, an axle connected to the wheel, and an offset base connected to the axle. The offset base is offset by a distance. The offset base includes a connection to a computing device support.

In a second implementation, a computing device support is described. The computing device support includes a mount configured to receive a computing device. The computing device support includes a plurality of legs. At least one of the plurality of legs is connected to the mount. The computing device support includes at least one offset caster as described herein.

In a third implementation, a system for moving a computing device is described. The system includes a computing device and a computing device support as described herein. The computing device support includes at least one offset caster as described herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 4-1 is a side view of the implementation of the computing device support of FIG. 1 with the casters in an inward position;

FIG. 4-2 is a side view of the implementation of the computing device support of FIG. 1 with the casters in an outward position;

FIG. 4-3 is a side view of the implementation of the computing device support of FIG. 1 with the front casters in an inward position and the rear casters in an outward position;

FIG. 6-1 is a top view of the implementation of the offset caster of FIG. 1 with the wheel in an inward position;

FIG. 6-2 is a top view of the implementation of the offset caster of FIG. 1 with the wheel in an outward position;

FIG. 7-1 is a side view of the implementation of the offset caster of FIG. 1 with the wheel in an inward position and the brake in a free position;

FIG. 7-2 is a side view of the implementation of the offset caster of FIG. 1 with the wheel in an inward position and the brake in a caster locked position;

FIG. 7-3 is a side view of the implementation of the offset caster of FIG. 1 with the wheel in an inward position and the brake in the caster locked and a wheel locked position;

FIG. 7-4 is a side view of the implementation of the offset caster of FIG. 1 with the wheel in an outward position and the brake in the free position;

DETAILED DESCRIPTION

This disclosure generally relates to offset casters, computing device supports, systems for supporting a computing device, and methods of use. More particularly, this disclosure generally relates to offset casters that may be used to alter the center of gravity of a support and/or may provide a brake that maintains its position relative to the support.

In at least one implementation, an offset caster may alter the center of gravity of a computing device support by 25.0 millimeters (mm). In at least one implementation, an offset caster may alter the center of gravity of a computing device support by more than 1% of the distance between two wheels. In at least one implementation, an offset caster may provide access to a brake regardless of wheel position. In at least one implementation, an offset caster may provide a brake that may limit caster rotation and/or wheel rotation. In at least one implementation, an offset caster may provide a brake that may engage with a single push of an actuator and may disengage with a single push of the actuator.

Figure 1:
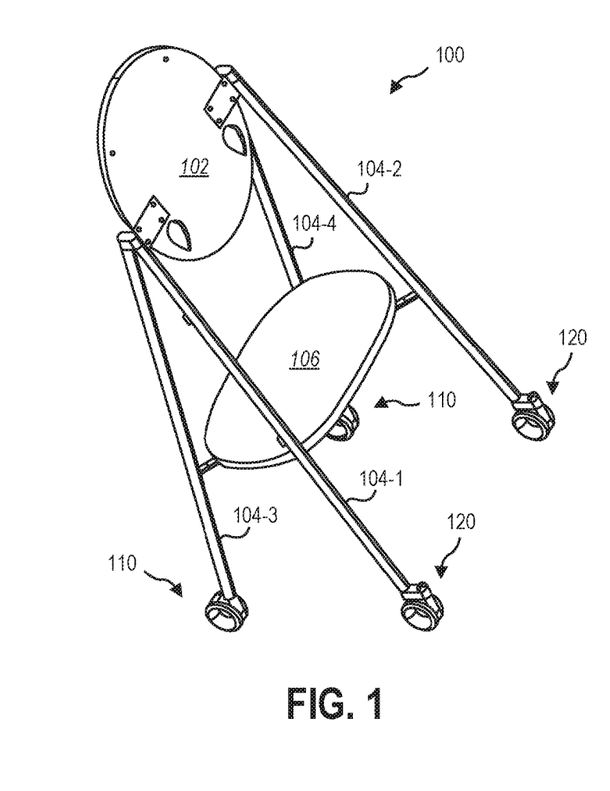
FIG. 1 is an isometric view of an implementation of a computing device support.
Figure 2:
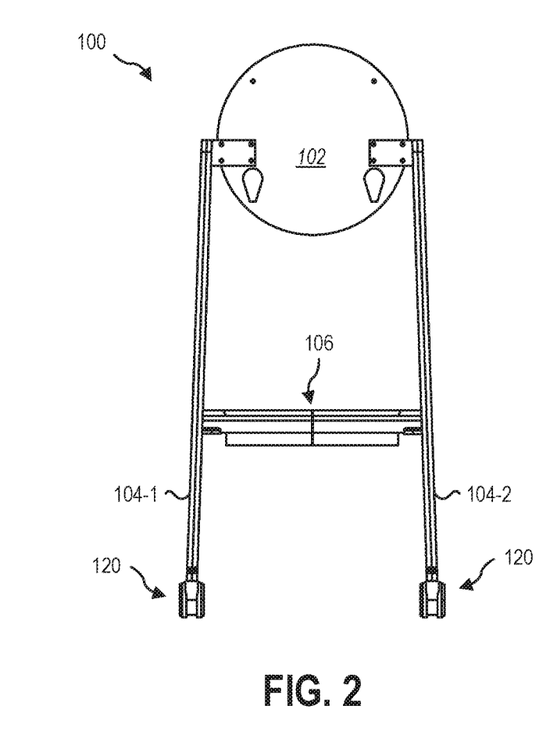
FIG. 2 is a front view of the implementation of the computing device support of FIG. 1.
Figure 3:
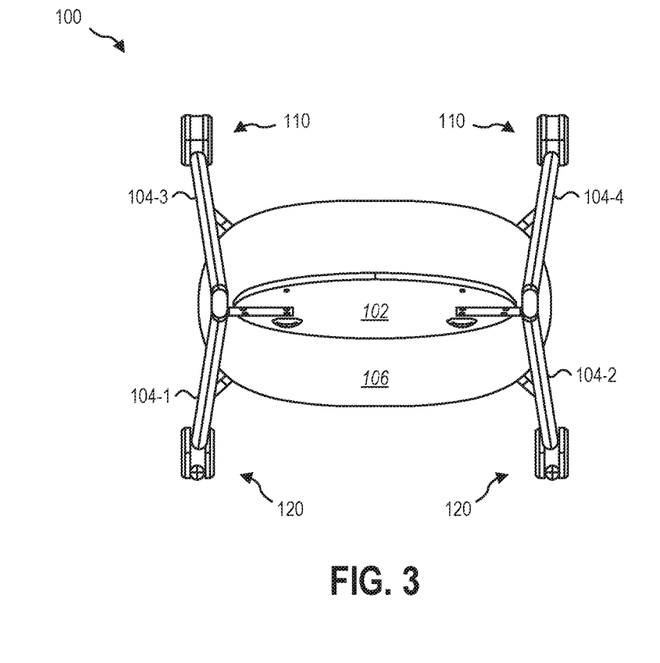
FIG. 3 is a top view of the implementation of the computing device support of FIG. 1.

FIG. 1 is an isometric view of an implementation of a computing device support 100. FIG. 2 is a front view of the implementation of the computing device support 100 of FIG. 1. FIG. 3 is a top view of the implementation of the computing device support 100 of FIG. 1.

Referring generally to FIGS. 1-3, the computing device support 100 may include a mount 102. The mount 102 may receive a computing device. Computing devices may include monitors, displays, smart televisions, tablet computers, hybrid computers, laptops, or other computing devices. In implementations where the mount 102 has received a computing device, a system may be formed.

The computing device support 100 may include a plurality of legs 104. As shown, the computing device support 100 includes four legs 104-1, 104-2, 104-3, 104-4. The legs 104 may provide support to the mount 102. The computing device support 100 may include front legs (e.g., legs 104-1, 104-2) and rear legs (e.g., legs 104-3, 104-4).

As shown, the legs 104 may form an A-frame type easel. In other words, the pairs of legs 104 (e.g., one front leg and one rear leg) may be connected at one end. In other implementations, the legs 104 may be otherwise arranged. In some implementations, the rear legs may be shorter than the front legs and/or may connect at a location along the length of the front leg. For example, the rear legs may be connected near the middle of the front legs.

Figure 41:
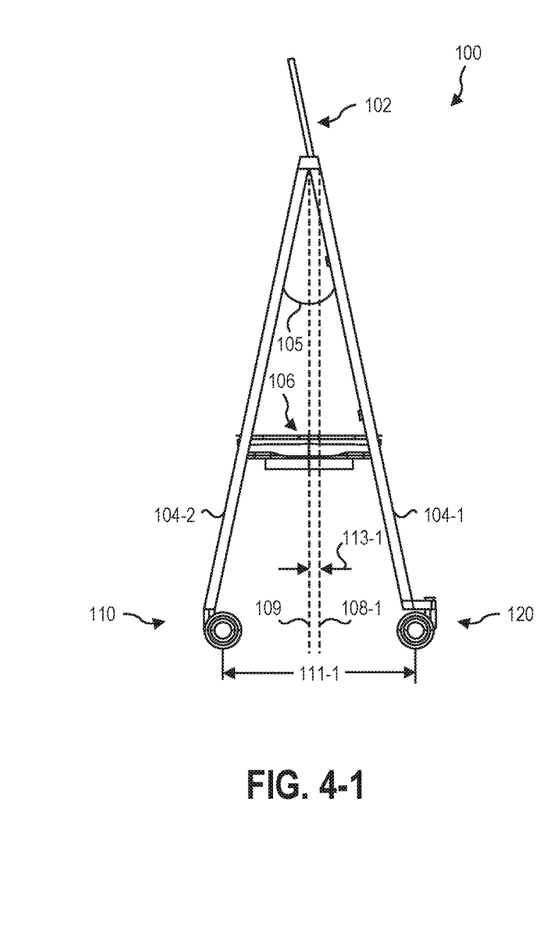

Referring briefly to FIG. 4-1, a side view of the implementation of the computing device support 100 of FIG. 1, the legs 104 may form an angle 105 between them. In some implementations, the angle 105 may be in a range having an upper value, a lower value, or upper and lower values including any of 15 degrees, 20 degrees, 25 degrees, 30 degrees, 35 degrees, 40 degrees, or any value therebetween. For example, the angle 105 may be 15 degrees. In other examples, the angle 105 may be less than 40 degrees. In further examples, the angle 105 may be greater than 20 degrees. In yet other examples, the angle 105 may be in a range of 15 degrees to 40 degrees. In yet further examples, the angle 105 may be in a range of 20 degrees to 35 degrees.

Referring back to FIGS. 1-3, the computing device support 100 may include storage 106. The storage 106 may be connected to one or more legs 104. As shown, the storage 106 is connected to each leg 104. The storage 106 may be used to support one or more components of a computing device. For example, the processor and/or memory of a computing device may be supported by the storage 106 and connected to a monitor. In another example, a keyboard, a mouse, a digital pen, other accessories, or combinations thereof may be supported by the storage 106.

The computing device support 100 may include one or more casters (e.g., casters 110, 120). The computing device support 100 may include one or more types of casters. As shown, the rear legs (e.g., legs 104-3, 104-4) are connected to casters 110 and the front legs (e.g., legs 104-1, 104-2) are connected to offset casters 120. In at least one implementation, the computing device support 100 includes at least one offset caster 120.

With larger computing devices received by the mount 102, the stability of the computing device support 100 may be affected. For example, for a computing device (e.g., monitor) that is a weight greater than 40 kg, a weight less than 50 kg, a diagonal length of greater than 150 cm, or combinations thereof, the center of gravity of the computing device support 100 with a mounted computing device may move toward the back of the computing device support 100. In at least one implementation, the use of an offset caster may adjust the center of gravity of the computing device support 100 to offset the effects of the computing device.

Referring back to FIG. 4-1, the casters 110, 120 are both shown in an inward position. In this position, a distance 111-1 between the casters 110, 120 is shown. The center of gravity without an offset caster 120 is shown as line 109. With the offset caster 120, the center of gravity is shown as line 108-1 with the casters 110, 120 in the inward position. Thus, the center of gravity is altered by a distance 113-1 with the casters 110, 120 in the inward position.

Figure 42:
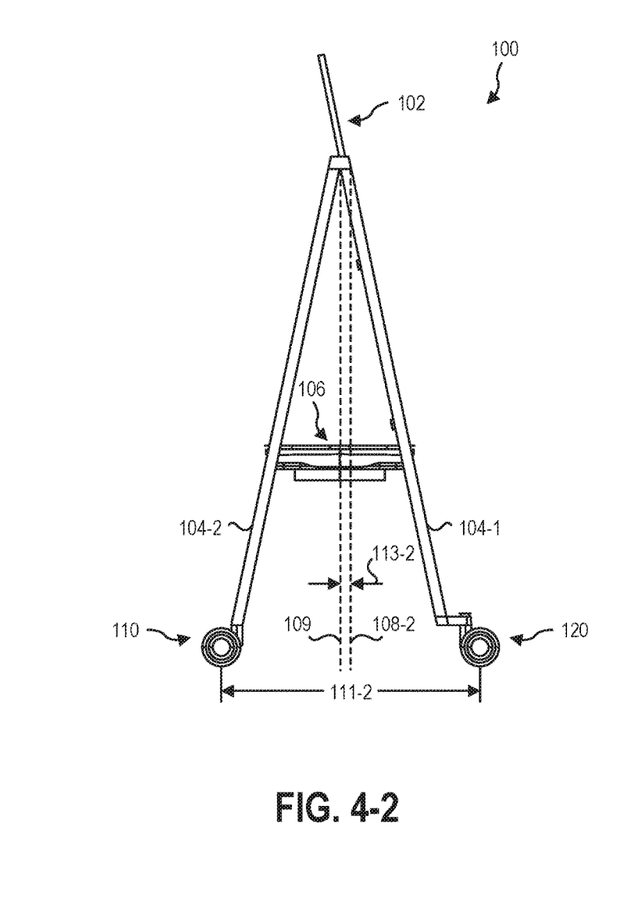

FIG. 4-2 is a side view of the implementation of the computing device support 100 of FIG. 1 with the casters 110, 120 in an outward position. In this position, a distance 111-2 between the casters 110, 120 is shown. The center of gravity without an offset caster 120 is shown as line 109. With the offset caster 120, the center of gravity is shown as line 108-2 with the casters 110, 120 in the outward position. Thus, the center of gravity is altered by a distance 113-2 with the casters 110, 120 in the outward position.

Figure 43:
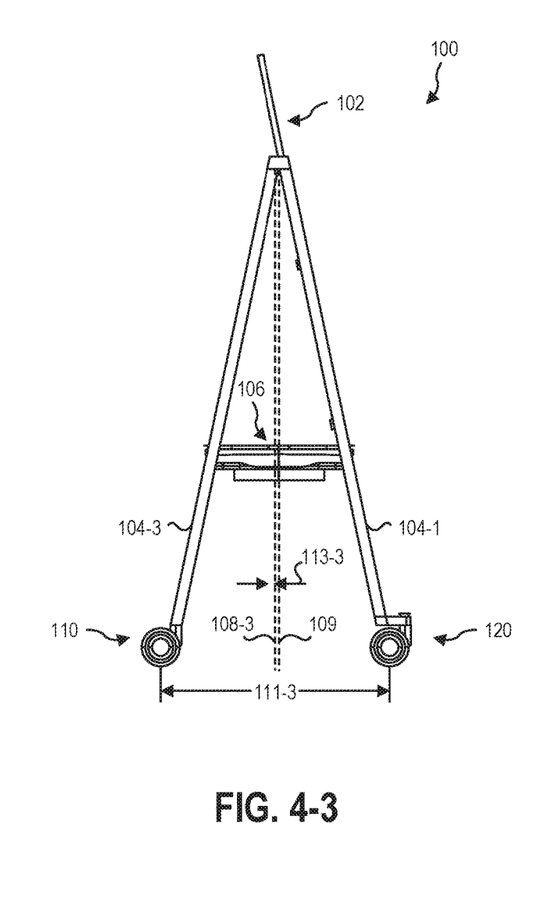

FIG. 4-3 is a side view of the implementation of the computing device support 100 of FIG. 1 with the front casters 120 in an inward position and the rear casters 110 in an outward position. In this position, a distance 111-3 between the casters 110, 120 is shown. The center of gravity without an offset caster 120 is shown as line 109. With the offset caster 120, the center of gravity is shown as line 108-3 with the front casters 120 in an inward position and the rear casters 110 in an outward position. Thus, the center of gravity is altered by a distance 113-3 with the front casters 120 in an inward position and the rear casters 110 in an outward position.

Figure 5:
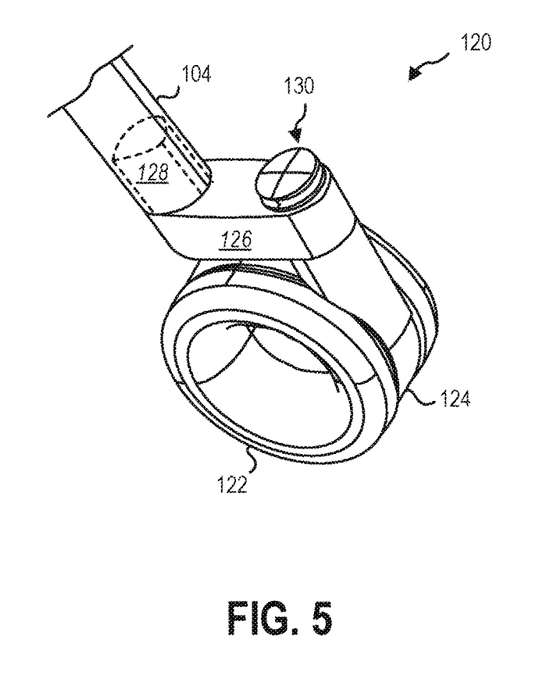
FIG. 5 is an isometric view of an implementation of an offset caster.

FIG. 5 is an isometric view of an implementation of an offset caster 120 as shown in FIGS. 1 through 4-3. The offset caster 120 includes a wheel 122 and an axle 124 connected to the wheel 122. As shown, the axle 124 extends around the wheel 122. In other implementations, the axle 124 may be otherwise positioned.

The axle 124 is connected to an offset base 126. The offset base 126 may include a connection 128. The connection 128 may connect a computing device support (e.g., computing device support 100) to the offset caster 120. For example, the connection 128 may connect to a leg 104 of a computing device support. The caster 120 may include a brake 130. The caster 120 may pivot about the brake 130.

Figure 61:
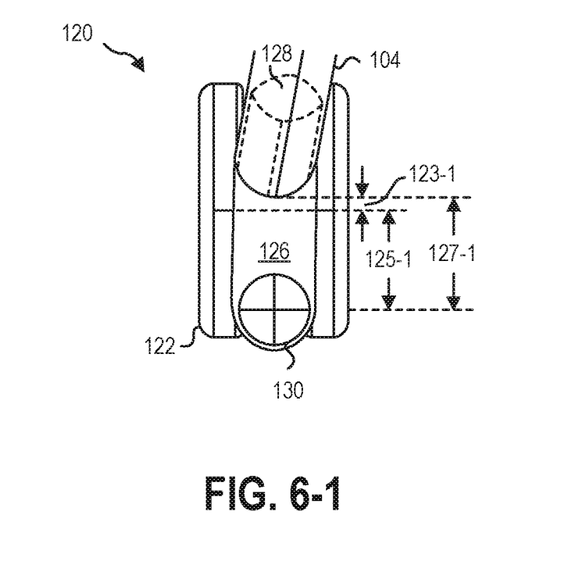
Figure 62:
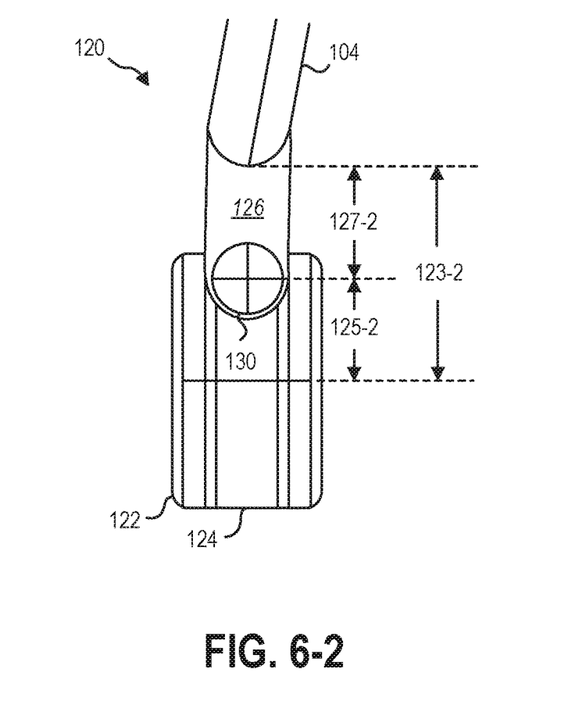

FIG. 6-1 is a top view of the implementation of the offset caster 120 of FIG. 1 with the wheel 122 in an inward position. In other words, the wheel 122 may be oriented toward an inside of a computing device support. FIG. 6-2 is a top view of the implementation of the offset caster 120 of FIG. 1 with the wheel 122 in an outward position. In other words, the wheel 122 may be oriented away from the inside of a computing device support. As shown in FIG. 6-2, the axle 124 may wrap, at least partially, around the wheel 122.

Referring generally to FIGS. 6-1 and 6-2, the leg 104 may connect to the offset base 126 at an angle. As shown, the leg 104 connects to the offset base 126 at an angle (not labeled) from the vertical relative to the side face of the offset base 126 and at an angle (not labeled) from the vertical relative to the front face of the offset base 126, as shown. In other implementations, the leg 104 may be parallel to the vertical or may vary from the vertical in only one direction (e.g., only relative to the side face or the front face).

A distance 123 from the front edge of the leg 104 and a centerline of the axle 124 is shown. In the inward position, the distance 123-1 is relatively small. In the outward position, as shown in FIG. 6-2, the distance 123-2 is relatively large. In other words, the distance 123-1 in the inward position may be smaller than the distance 123-2 in the outward position.

A distance 125 may be defined from the center of the brake 130 to the front edge of the leg 104. The distance 125-1 in FIG. 6-1 and the distance 125-2 in FIG. 6-2 are the same, because the caster 120 pivots about the brake 130. In implementations where the caster 120 pivots about another point, the distance 125 may change between the inward and outward positions (as well as sideways positions).

A distance 127 may be defined from the center of the brake 130 to the front edge of the leg 104. The distance 127-1 in FIG. 6-1 and the distance 127-2 in FIG. 6-2 are the same, as the brake 130 does not change position in the top view from the inward to the outward position.

FIGS. 7-1 through 7-3 are side views illustrating internal components of the implementation of the offset caster 120 of FIG. 1 with the wheel 122 in an inward position. FIG. 7-1 illustrates the brake 130 in a free position, FIG. 7-2 illustrates the brake 130 in a caster locked position, and FIG. 7-3 illustrates the brake 130 in the caster locked and a wheel locked position. FIG. 7-4 is a side view of the implementation of the offset caster 120 of FIG. 1 with the wheel 122 in an outward position and the brake 130 in the free position.

Figure 71:
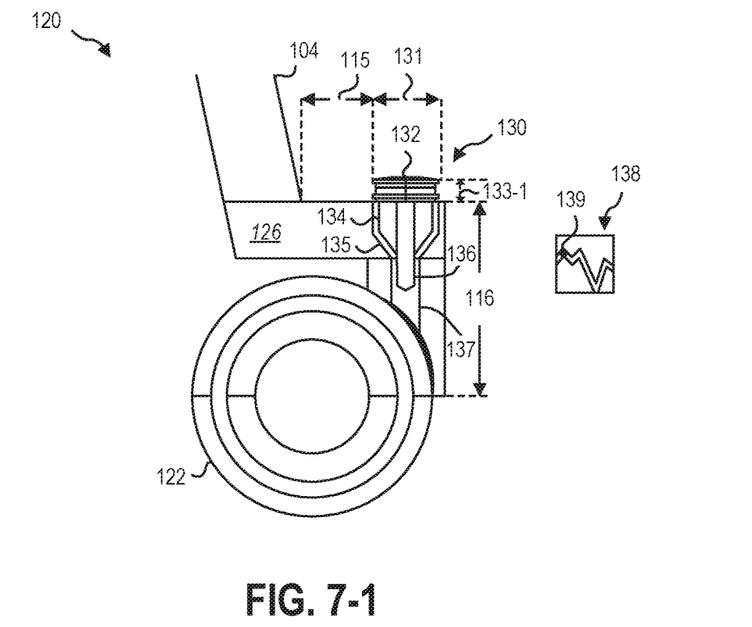

FIG. 7-1 illustrates a distance 115 between the brake 130 and the leg 104. This distance 115 may facilitate a user's access to the brake 130, regardless of the position of the wheel 122. In other words, whether the wheel 122 is in the inward, outward, sidewards, or otherwise positioned, the user may access the brake 130 without having to move the wheel 122.

A distance 116 from the center of the wheel 122 to the top of the offset base 126 is also shown. The brake 130 may utilize space in this distance 116 for various components as will be described below.

Figure 8:
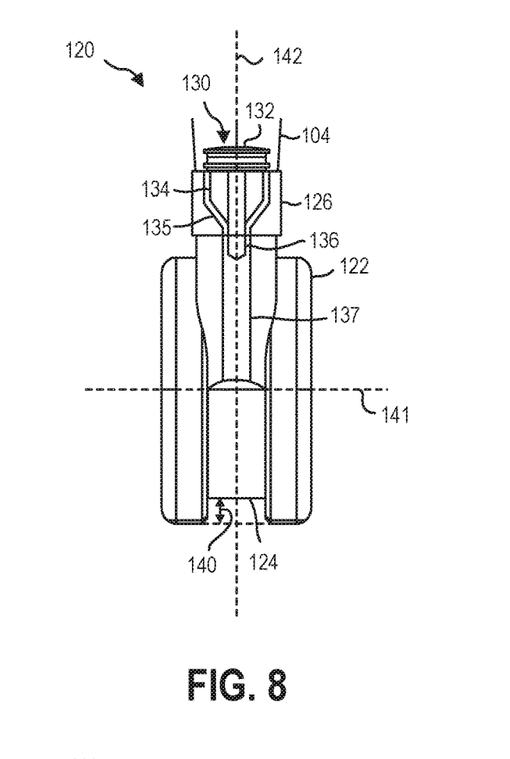
FIG. 8 is a front view of the implementation of the offset caster of FIG. 1 with the brake in the free position.

The brake 130 may have a dimension 131. The dimension in FIGS. 7-1 through 8 is the diameter of the brake 130. In other implementations, the dimension 131 may be a width or other major dimension.

Referring generally to FIGS. 7-1 through 7-4, the brake 130 includes an actuator 132 that is connected to a caster brake 134 and a wheel brake 136. The wheel brake 136 is shown as being slidable within the caster brake 134. The offset base 126 includes a caster brake receptacle 135 and a wheel brake receptacle 137.

Figure 72:
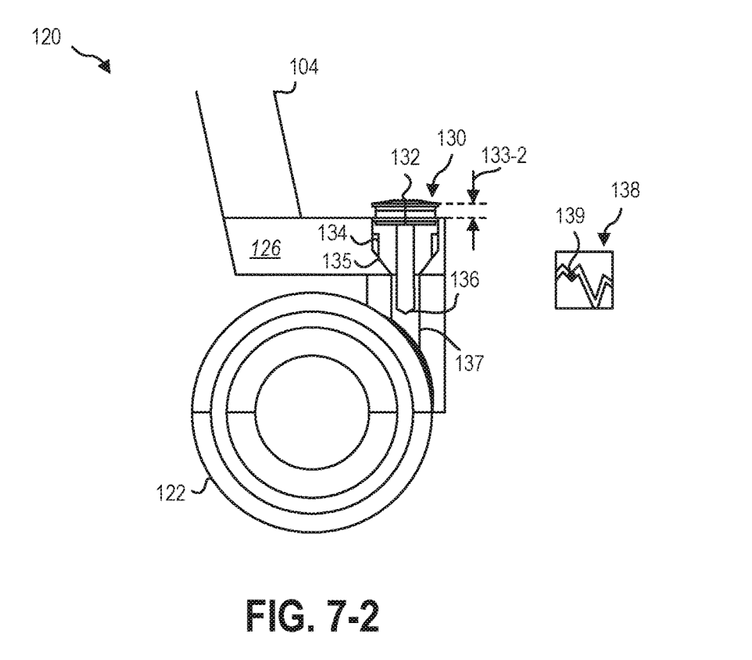
Figure 73:
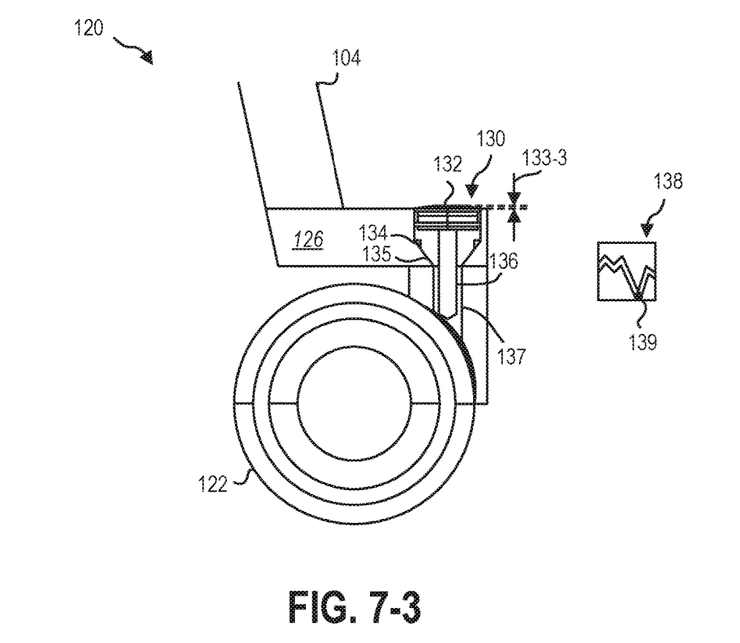
Figure 74:
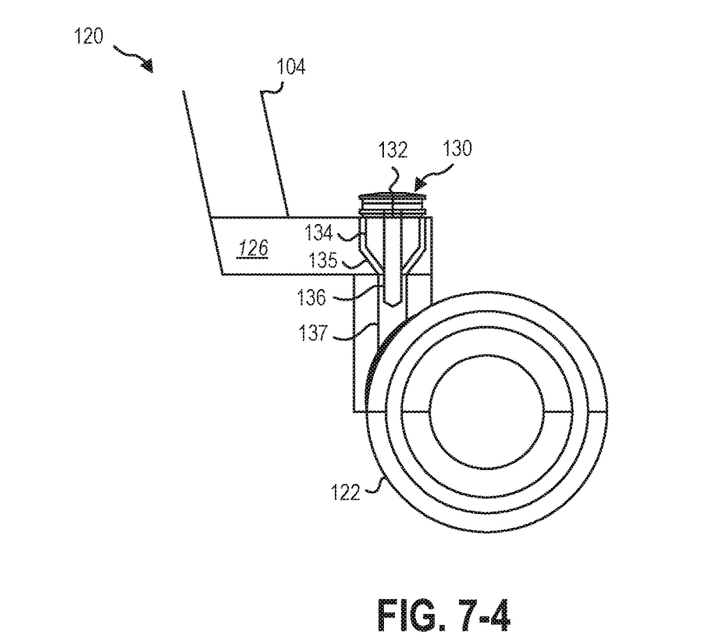

The brake 130 may include a brake index 138. The brake index 138 is shown on the side of FIGS. 7-1 through 7-3 and may be found around an inside of the offset base 126. The brake index 138 may control the brake 130. As shown in FIGS. 7-1 through 7-3, the brake index 138 may create three positions for the brake 130, the free position, the caster locked position, and the wheel locked position. In other implementations, more or fewer positions may be used. In the caster locked position, rotation of the wheel 122 about an axis perpendicular to an axis of the axle 124 is limited. In the wheel locked position, rotation of the wheel 122 about the axle 124 is limited.

The brake 130 may be biased toward a position. As shown, the brake 130 may be biased toward the free position. For example, a biasing element (not shown), such as a spring, may bias the brake 130 toward the free position.

The brake 130 may include a brake pin 139. The brake pin 139 may be located on the brake 130. In other implementations, the brake index 138 may be on the brake 130 while the brake pin 139 may be on the offset base 126. As shown in FIGS. 7-1 through 7-3, the brake index 138 may include a channel in which the brake pin 139 may slide. When the actuator 132 is first activated (e.g., pushed), the brake pin 139 may move from a first position (e.g., the free position) to a second position (e.g., the caster locked position). The brake pin 139 may be retained in the second position until the actuator 132 is actuated again. When the actuator 132 is second activated, the brake pin 139 may move from the second position (e.g., the caster locked position) to a third position (e.g., the free position). The brake pin 139 may be retained in the third position until the actuator 132 is actuated again. When the actuator 132 is third actuated, the brake pin 139 may move from the third position (e.g., the free position) to a fourth position (e.g., the wheel locked position and caster locked position). The brake pin 139 may be retained in the fourth position until the actuator 132 is actuated again. When the actuator 132 is fourth actuated, the brake pin 139 may move from the fourth position (e.g., the wheel locked position and the caster locked position) back to the first position (e.g., the free position).

As shown in FIGS. 7-1, 7-4 and 8, in the first position, the caster brake 134 is not engaged with the offset base 126 and the wheel brake 136 is not engaged with the wheel 122. As shown, a distance 133-1 is formed between the top of the offset base 126 and the top of the brake 130. The distance 133-1 is the largest, as shown. In the free position, the offset caster 120 may rotate about the brake 130 and the wheel 122 may rotate about the axle (e.g., axle 124). As shown in FIG. 7-2, in the second position, the caster brake 134 is engaged with the caster brake receptacle 135 while the wheel brake 136 is not engaged with the wheel 122. In this position, the distance 133-2 is smaller than the distance 133-1 of the free position. As shown in FIG. 7-3, in the fourth position, the caster brake 134 is engaged with the caster brake receptacle 135 and the wheel brake 136 is engaged with the wheel 122. In this position, the distance 133-3 is smaller than both the distance 133-2 of the caster locked position and the distance 133-1 of the free position.

In order to engage both the wheel brake 136 and the caster brake 134, the caster brake 134 may be formed of an elastomeric material. For example, as shown in FIG. 7-3, the caster brake 134 may deform sufficiently to allow the wheel brake 136 to engage the wheel 122. In other implementations, the caster brake 134 and the wheel brake 136 may be separated and/or may be separately actuated.

FIG. 8 is a front view of the implementation of the offset caster 120 of FIG. 1 with the brake 130 in the free position. As shown in FIG. 8, the axle 124 may have a gap 140 between the axle 124 and the ground. An axis 141 may extend through the wheel 122 and may be colinear with an axis of the axle 124. An axis 142 may extend perpendicular to the axis 141. The axis 142 may extend through the center of the brake 130. In other implementations, the axis 142 may extend through another portion of the offset base 126. The brake 130 may limit rotation about the axis 141 (e.g., about the wheel 122) and/or may limit rotation of the offset caster 120 about the axis 142 (e.g., about the brake 130).

Referring briefly back to FIG. 5, the brake 130 may extend above a top surface of the offset base 126. A portion of the brake 130 above the top surface may be colored to indicate the state of the brake 130. For example, the portion may be green to indicate that the device is unlocked. In another example, the portion may be partially green at the bottom to indicate that the axle is free and partially yellow at the top to indicate that the wheel is free, but the axle is locked.

Figure 9:
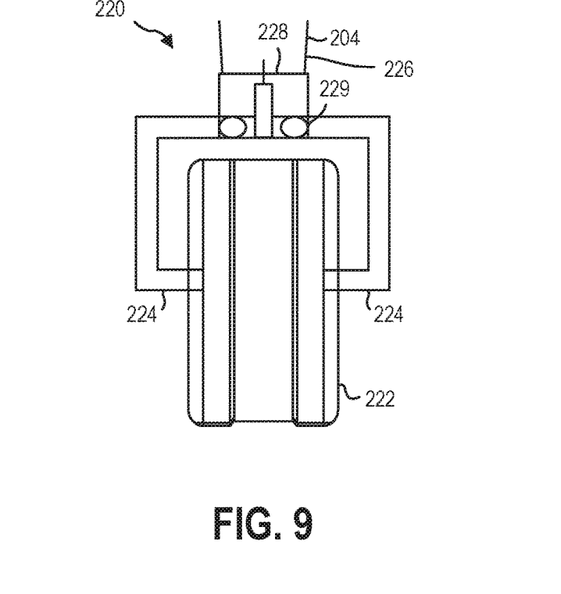
FIG. 9 is a front view of a second implementation of the offset caster with a brake in a free position.
Figure 10:
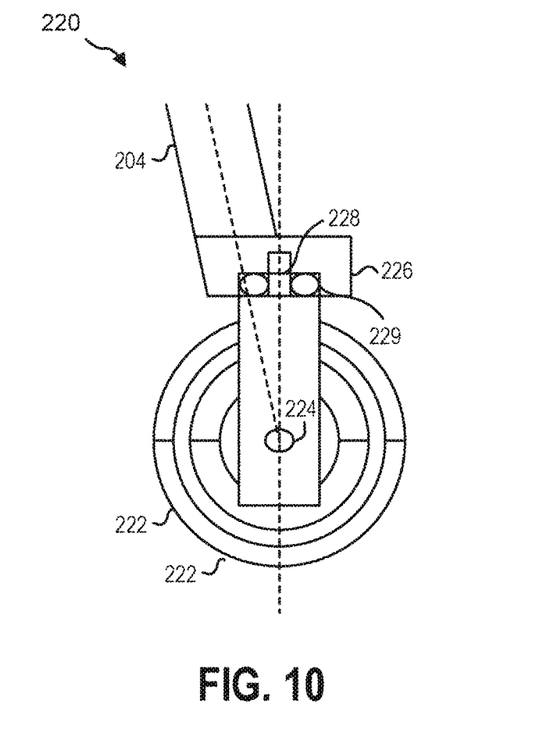
FIG. 10 is a side view of the implementation of the offset caster of FIG. 9.

FIG. 9 is a front view of a second implementation of the offset caster 220 and FIG. 10 is a side view of the implementation of the offset caster 220 of FIG. 9. Referring generally to FIGS. 9 and 10, the offset caster 220 may include a wheel 222 supported by an axle 224. The axle 224 of the offset caster 220 of FIGS. 9 and 10 may differ from the axle 124 of the implementation of an offset caster 120 of FIGS. 1 through 8. For example, the axle 224 may extend through the wheel 222. In another example, the axle 224 may be forked.

The axle 224 may be connected to an offset base 226. As with the offset base 126 of FIG. 1 through 8, the offset base 226 of FIGS. 9 and 10 a leg 204 may connect to the offset base 226 at an angle.

The axle 224 may connect to the offset base 226 by a connection 228. The connection 228 may extend into the offset base 226 to provide support for the axle 224. The offset base 226 may include a connection surface. As shown, the connection surface may include bearings 229. The bearings 229 may facilitate rotation of the offset caster 220 about the connection 228.

Unlike the offset caster 120 of FIGS. 1 through 8, the offset caster 220 of FIGS. 9 and 10 may not include a brake (e.g., brake 130). In some implementations, the offset caster 120 of FIGS. 1 through 8 and/or the offset caster 220 of FIGS. 9 and 10 may include or exclude a brake (e.g., brake 130).

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An offset caster, comprising:
   a wheel;
   an axle connected to the wheel;
   an offset base connected to the axle, the offset base being offset by a distance, the offset base including a connection to a computing device support; and
   a brake connected to the offset base such that the brake is unobstructed by the offset base in a vertical direction as the offset caster pivots entirely about the brake.

2. The offset caster of claim 1, wherein a first position locks rotation of the wheel about an axis perpendicular to an axis of the axle and wherein a second position locks rotation of the wheel about the axle.

3. The offset caster of claim 1, wherein the brake extends through the offset base.

4. The offset caster of claim 1, wherein the brake locks rotation of the wheel about the axle.

5. The offset caster of claim 1, wherein the brake locks rotation of the wheel about an axis perpendicular to an axis of the axle.

6. The offset caster of claim 1, wherein the brake is engaged with a first single push in a first direction and disengaged with a second single push in the first direction.

7. The offset caster of claim 1, wherein the brake does not change position relative to the connection to the computing device support.

8. The offset caster of claim 1, wherein the brake does not change position relative to the offset base even when the wheel moves about the offset base and about an axis perpendicular to an axis of the axle.

9. The offset caster of claim 1, wherein the brake is configured to engage in a first position and a second position.

10. An offset caster, comprising:
    a wheel;
    an axle connected to the wheel; and
    an offset base connected to the axle, the offset base being offset by a distance, the offset base including a connection to a computing device support, wherein a first position locks rotation of the wheel about an axis perpendicular to an axis of the axle and wherein a second position locks rotation of the wheel about the axle.

11. A computing device support, comprising:
    a mount configured to receive a computing device;
    a plurality of legs, at least one of the plurality of legs connected to the mount; and an offset caster including:
  a wheel;
  an axle connected to the wheel;
  an offset base connected to the axle, the offset base being offset by a distance, the offset base connected to the one of the plurality of legs of the computing device support by a connector; and
  a brake connected to the offset base, wherein the offset caster pivots about the brake.

12. The computing device support of claim 11, wherein the mount is configured to attach to the computing device.

13. The computing device support of claim 11, wherein the mount is directly connected to one of the plurality of legs.

14. The computing device support of claim 11, wherein the plurality of legs includes a pair of front legs and a pair of back legs.

15. The computing device support of claim 14, wherein the offset caster is connected to a first leg of the pair of front legs and a second offset caster is connected to a second leg of the pair of front legs.

16. The computing device support of claim 15, wherein a third offset caster is connected to a first leg of the pair of back legs and a fourth offset caster is connected to a second leg of the pair of back legs.

17. The computing device support of claim 15, wherein a third caster is connected to a first leg of the pair of back legs and a fourth caster is connected to a second leg of the pair of back legs.

18. The computing device support of claim 11, further comprising storage.

19. The computing device support of claim 11, further comprising a monitor.

20. The computing device support of claim 11, wherein a first position locks rotation of the wheel about an axis perpendicular to an axis of the axle and wherein a second position locks rotation of the wheel about the axle.

* * * * *